(12) United States Patent
Durif

(10) Patent No.: US 8,365,786 B2
(45) Date of Patent: Feb. 5, 2013

(54) TIRE FOR HEAVY VEHICLE

(75) Inventor: Pierre Durif, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 718 days.

(21) Appl. No.: 12/517,639

(22) PCT Filed: Nov. 30, 2007

(86) PCT No.: PCT/EP2007/063096
§ 371 (c)(1),
(2), (4) Date: Dec. 18, 2009

(87) PCT Pub. No.: WO2008/068204
PCT Pub. Date: Jun. 12, 2008

(65) Prior Publication Data
US 2010/0096061 A1    Apr. 22, 2010

(30) Foreign Application Priority Data
Dec. 4, 2006    (FR) ........................................ 0610614

(51) Int. Cl.
*B60C 9/18*    (2006.01)

(52) U.S. Cl. .......................... 152/532; 152/537; 152/538

(58) Field of Classification Search .................. 152/526, 152/532, 536–538; *B60C 9/18, 9/20, 9/22*
See application file for complete search history.

(56) References Cited

U.S. PATENT DOCUMENTS
| | | | |
|---|---|---|---|
| 5,201,971 A | 4/1993 | Gifford | |
| 6,701,986 B2 * | 3/2004 | Tanaka | 152/209.14 |
| 2006/0124217 A1 | 6/2006 | Frank et al. | |

FOREIGN PATENT DOCUMENTS
| | | |
|---|---|---|
| FR | 2 756 778 | 6/1998 |
| FR | 2 770 458 | 5/1999 |
| JP | 2 754 769 | 4/1998 |
| WO | WO 02/090135 | 11/2002 |

* cited by examiner

*Primary Examiner* — Justin Fischer
*Assistant Examiner* — Philip N Schwartz
(74) *Attorney, Agent, or Firm* — Cozen O'Connor

(57) ABSTRACT

A tire for a heavy vehicle, with radial carcass reinforcement, having an outside radius R greater than 1000 mm, comprising a crown reinforcement radially interposed between the carcass reinforcement and the tread, said crown reinforcement having at least one protective crown reinforcement radially adjacent to the tread. The tire comprises a complex having at least one layer of polymer mix with an axial width that is less than the width of the working crown reinforcement and with a thickness that is greater than 16 mm, the elastic modulus of said complex having a radial gradient, the lowest elastic modulus being greater than 15 MPa.

16 Claims, 2 Drawing Sheets

TIRE FOR HEAVY VEHICLE

RELATED APPLICATIONS

This is a U.S. National Phase Application under 35 USC 371 of International Application PCT/EP2007/063096, filed on Nov. 30, 2007.

This application claims the priority of French patent application no. 06/10614 filed Dec. 4, 2006, the subject matter of which is hereby incorporated by reference.

FIELD OF THE INVENTION

This invention relates to a tire intended to be used on a heavy civil engineering type vehicle or machine, said tire comprising at least one radial carcass reinforcement surmounted radially by a tread and having an axial width greater than 18 inches.

Although not limited to this type of application, the invention will be described more particularly with reference to tires for loader type vehicles working in mines and having an axial width greater than 18 inches. This type of loader is used in mines for filling the skips of dumper type vehicles.

BACKGROUND OF THE INVENTION

The reinforcing part or reinforcement of tires, especially tires for civil engineering machine, at the present time usually takes the form of a stack of one or more layers conventionally denoted "carcass layers", "crown layers", etc. These names for the reinforcing parts stem from the manufacturing process, which involves building a series of semi-finished products in the form of layers containing often longitudinal reinforcing threads which are then assembled or stacked to create an unfinished tire. The layers are produced flat, in large dimensions, and are then cut to suit the dimensions of a given product. The layers are also initially assembled in an essentially flat form. This unfinished tire is then shaped to give it the typical toroidal shape of a tire. Semi-finished products known as finishing products are then applied to the unfinished tire to obtain a product ready for curing.

This type of "conventional" method involves using, especially for the stage of building the unfinished tire, an anchor element (generally a bead core) to anchor or immobilize the carcass reinforcement in the bead area of the tire. For this type of method, therefore, a portion of all the layers forming the carcass reinforcement (or only some) are turned up around a bead core laid in the bead of the tire. This anchors the carcass reinforcement in the bead.

The widespread adoption by the industry of this conventional type of method, despite numerous variants in the way in which the layers are constructed and assembled, has resulted in those skilled in the art using a vocabulary based on this method. Hence the generally accepted terminology, typically including the terms "layers", "carcass", "bead core", and "shaping" to refer to the transition from a flat profile to a toroidal profile, etc.

There are now in existence tires that do not strictly speaking have "layers" or "bead cores" by the definitions given above. For example, document EP 0 582 196 discloses tires constructed without the aid of semi-finished products in the form of layers. For example, the reinforcing elements of the different reinforcing structures are applied directly to the adjacent layers of rubber compounds, and the whole is then applied by successive layers to a toroidal core whose shape produces directly a profile close to the final profile of the tire during manufacture. There are therefore no "semi-finished" products or "layers" or "bead cores" in that type of tire. The basic products such as rubber compounds and the reinforcing elements in the form of threads or filaments are applied directly to the core. Since this core is torus-shaped, there is no need to form the unfinished tire to turn it from a flat profile to a torus-shaped profile.

Additionally, the tires described in that document have no "traditional" turn up of the carcass layer around a bead core. This type of anchoring is replaced by an arrangement in which circumferential threads are laid adjacent to said sidewall reinforcing structure, the whole being embedded in an anchoring or bonding rubber compound.

There are also methods which assemble on the toroidal core using semi-finished products specially adapted for rapid, efficient and simple laying on a central core. Lastly, it is also possible to use a mixture combining certain semi-finished products to create certain architectural aspects (such as layers, bead cores, etc.), while others are made by the direct application of compounds and/or reinforcing elements.

In the present document, in order to keep up with recent technological changes in both the manufacture and design of products, conventional terms such as "plies" (that is, layers), "bead cores", etc., are advantageously replaced by neutral terms or terms independent of the type of method used. Hence the term "carcass-type reinforcement" or "sidewall reinforcement" is a good designation for the reinforcing elements of a carcass layer in the conventional method, and the corresponding reinforcing elements, usually applied to the sidewalls, of a tire built in accordance with a method that uses no semi-finished products. The term "anchor region" can refer equally well to the "traditional" turn-up of a carcass layer around a bead core in a conventional method, or to the assembly formed by the circumferential reinforcing elements, the rubber compound, and the adjacent sidewall reinforcing portions of a bottom region formed by a method using application on a toroidal core.

Regarding the usual design of tires for civil engineering type vehicle, the radial carcass reinforcement anchored in each bead is composed of at least one layer of metal reinforcing elements, these elements being approximately parallel to each other in the layer. The carcass reinforcement is usually capped by a crown reinforcement consisting of at least two working crown layers of metal reinforcing elements which, however, each form an intersecting angle with the next layer and form with the circumferential direction angles of between 10° and 65°. Between the carcass reinforcement and the working crown layers, there are usually two layers of reinforcing elements, those of one layer forming an intersecting angle with those of the next and having angles of less than 12°; the width of these layers of reinforcing elements is usually less than the widths of the working layers. Radially outward of the working layers are protective layers whose reinforcing elements are at angles of between 10° and 65°. The crown reinforcement itself is capped by a tread.

The term "axial" denotes a direction parallel to the axis of rotation of the tire, while "radial" means a direction that intersects the axis of rotation of the tire at right angles. The axis of rotation of the tire is the axis about which the tire rotates in normal use.

A circumferential plane or circumferential cutting plane is a plane perpendicular to the tire's axis of rotation. The equatorial plane or circumferential mid-plane is the circumferential plane passing through the centre or crown of the tread which divides the tire into two halves.

A radial plane is a plane containing the tire's axis of rotation.

The longitudinal direction of the tire, or circumferential direction, is the direction corresponding to the periphery of the tire and is defined by the direction in which the tire rolls.

Tires for civil engineering machines, as described above, are usually inflated to a pressure of between 4 and 10 bar for normal loads and dimensions.

In a radial tire, and more especially a very large tire, the carcass is subjected to large radial deformations causing large deflections, due particularly to the load carried by the tire.

The dimensions of such tires linked with the loads they carry when rolling under load thus give rise to tire deflections of around 40%. They can for example experience increases of load greater than 50% under dynamic load increases associated for example with braking in the case of loader type vehicles.

The deflection of a tire is defined by the radial deformation of the tire, or variation of the radial height, as the tire adjusts from an unloaded state to a statically loaded state, under nominal load and pressure conditions.

Deflection is expressed in the form of relative deflection, defined as the ratio of this variation of the radial height of the tire to one half of the difference between the outside diameter of the tire and the maximum diameter of the wheel rim measured at the hook. The outside diameter of the tire is measured under static conditions in an unloaded state at nominal pressure.

Loaders which are used in mines for filling dumper type vehicles are used in a particular way that involves limited rolling but with operations combining forward or reverse rolling with heavy braking because the bucket of the loader may be rising at the same time as the loader is braking.

The wish for ever greater productivity leads to displacements with severe accelerations and heavy braking, and therefore increasing stresses on the tires.

Vehicle oscillations occur during the various braking phases. Besides being uncomfortable for the driver, these can also reduce productivity if the driver has to wait for the vehicle to stabilize before proceeding to the next stage of his journey. This particularly tends to occur when the loader brakes before emptying its bucket into the dumper to ensure that the bucket arms do not hit the edge of the skip and damage the loader.

SUMMARY OF THE INVENTION

One object of the invention is to provide tires for loader type vehicles capable of handling the normal conditions of use without creating excessive oscillations in terms of amplitude and time.

This object has been achieved in accordance with one aspect of the invention directed to a tire for heavy vehicle, with radial carcass reinforcement, having an outside radius R greater than 1000 mm, comprising a crown reinforcement radially interposed between the carcass reinforcement and the tread, said crown reinforcement having at least one protective crown reinforcement radially adjacent to the tread, the crown reinforcement comprising a complex having at least one layer of polymer mix with an axial width that is less than the width of the working crown reinforcement and with a thickness that is greater than 16 mm, and the elastic modulus of said complex having a radial gradient, the lowest elastic modulus being greater than 15 MPa.

For the purposes of the invention, a complex is an assembly of several elements which may be layers of polymer mixes or layers of reinforcing elements.

The outside radius R of the tire is the radius of the tire measured when mounted inflated at its nominal pressure and not loaded.

For the purposes of the invention, the elastic moduli are the elastic moduli of the layers and are measured according to the invention in the longitudinal direction.

The "elastic modulus" of a rubber compound here means a secant modulus of extension at 10% deformation and at room temperature; the reading is taken after the first cycle of accommodation up to 10% deformation:

$$E_{10} = \frac{F_{10}}{S \times \varepsilon_{10}} \text{ i.e. } E_{10} = \frac{F_{10}(1 + \varepsilon_{10})}{S_0 \times \varepsilon_{10}} \text{ and}$$

$$E_{10} = \frac{F_{10} \times 1.1}{S_0 \times 0.1} \text{ in which } \varepsilon_{10} \text{ is } 0.1;$$

where $E_{10}$ is the secant modulus of extension at 10% deformation; $F_{10}$ is the extension force at 10% extension; $S_0$ is the initial cross section of the test specimen; S is the cross section of the test specimen at the extension deformation $\varepsilon$, and in the case of rubber material it is known that:

$$S = \frac{S_0}{1 + \varepsilon};$$

and $\varepsilon_{10}$ is the 10% extension deformation. Measurements of elastic modulus of a rubber compound are performed in tension according to standard AFNOR-NFT-46002 September 1988: the nominal secant modulus (or apparent stress, in MPa) is measured on the second elongation (i.e. after one cycle of accommodation) at 10% elongation (normal conditions of temperature and hygrometry according to standard AFNOR-NFT-40101 December 1979).

In an advantageous embodiment of the invention, the layer of polymer mix has isotropic elasticity properties. In other words the layer of polymer mix has identical moduli of elasticity in all directions of elongation.

Tests performed on tires according to the invention have shown that the oscillations particularly observed during braking occasioned by the use of vehicles fitted with these tires are damped out much sooner, and the amplitude of these oscillations also reduces very quickly. This observation is accompanied by among other things an increase in the temperature of the central zone of the tire, while the temperatures at the shoulders are no different from those of tires of ordinary design.

The inventors' own interpretation of this is that these results are due to the presence, in the central part of the tire (viewed in radial cross section) of the high-modulus complex dissipating the energy. The thickness and elastic moduli of this complex are sufficient to produce a significant difference when measured by the subjective criteria of comfort.

The radial gradient of the elastic modulus defined according to the invention, combined with the choice of the elastic moduli results in, among other things, a shearing of said complex in the various phases of formation of the footprint between the tire and the ground on which it is rolling.

In one advantageous embodiment of the invention, the thickness of at least one layer of polymer mix of the complex is greater than 0.01 times the outside radius R of the tire.

A preferred embodiment of the invention also has the complex radially surmounted by at least four layers of reinforcing elements.

In accordance with an embodiment of the invention, the tire preferably has a deflection of greater than or equal to 40%.

In a preferred embodiment of the invention, the complex is radially interposed between the carcass reinforcement and the protective crown reinforcement.

The thickness of the complex is advantageously less than 0.03 times the outside radius R in order to leave a sufficient thickness of tread to meet the requirements in terms of wear and thermal behavior, especially for applications intended for loaders designed to work with dumper type vehicles.

In one embodiment of the invention, the complex includes a layer of polymer mix with a thickness greater than 0.01 times the outside radius R of the tire and at least one layer of reinforcing elements with a modulus greater than 10 000 MPa, said elements being oriented at an angle of less than 12°.

In this embodiment of the invention, the tire preferably comprises at least two radially adjacent layers of reinforcing elements of modulus greater than 10 000 MPa, the reinforcing elements being oriented at an angle of less than 12° and those of one layer forming an intersecting angle with those of the next.

Also preferably, according to the invention, the radially adjacent layers of reinforcing elements of modulus greater than 10 000 MPa and oriented at an angle of less than 12° are radially adjacent to the carcass reinforcement. In accordance with this type of embodiment, on its way through the footprint or contact patch, when the radially outermost part of the complex is under extension, the radially innermost part of the layer of polymer mix whose thickness is greater than 0.01 times the outside radius R of the tire is under compression. The shear stresses generated at this time are very great and absorb a great deal of energy, helping to damp out the oscillations of the vehicle.

In an advantageous variant of the invention, the crown reinforcement further comprises a working crown reinforcement consisting of at least two working crown layers, the working crown reinforcement being radially adjacent to the complex.

Tests have shown that the presence of a working crown reinforcement made up of at least two layers of reinforcing elements results in a greater consumption of energy by shear between the reinforcing elements of a given layer; this greater energy consumption has been demonstrated particularly by a still greater increase in the temperature in the crown region of the tire.

In a preferred embodiment of the invention, the working crown reinforcement is radially adjacent to that part of the complex which has the lowest modulus.

Preferably again, the working crown reinforcement is radially adjacent to the protective crown reinforcement.

In these latter variants of the invention, the deformation of the working layers is accentuated in the direction of elongation, which is better in terms of the endurance of the tire.

In an advantageous variant of the invention, the working crown layers are composed of metal reinforcing elements forming an angle with the circumferential direction of between 18° and 60°.

Also advantageously, the reinforcing elements of one working crown layer form an intersecting angle with those of the next.

An embodiment of the invention also advantageously provides that the protective crown reinforcement is made up of at least two layers of elastic metal reinforcing elements forming an angle with the circumferential direction of between 18° and 60°.

In a preferred embodiment of the invention, at least one protective crown layer, preferably at least the radially innermost protective crown layer, has an axial width greater than the width of the axially widest working crown layer.

BRIEF DESCRIPTION OF THE DRAWINGS

Other details and advantageous features of the invention will be shown below in the description of illustrative embodiments of the invention with reference to FIGS. 1 and 2, which show.

DETAILED DESCRIPTION OF THE DRAWINGS

For ease of understanding, the figures are not shown to scale. The figures show only a half-view of a tire, which is continued symmetrically about the XX' axis, which represents the circumferential midplane, or equatorial plane, of a tire.

Figure 1:
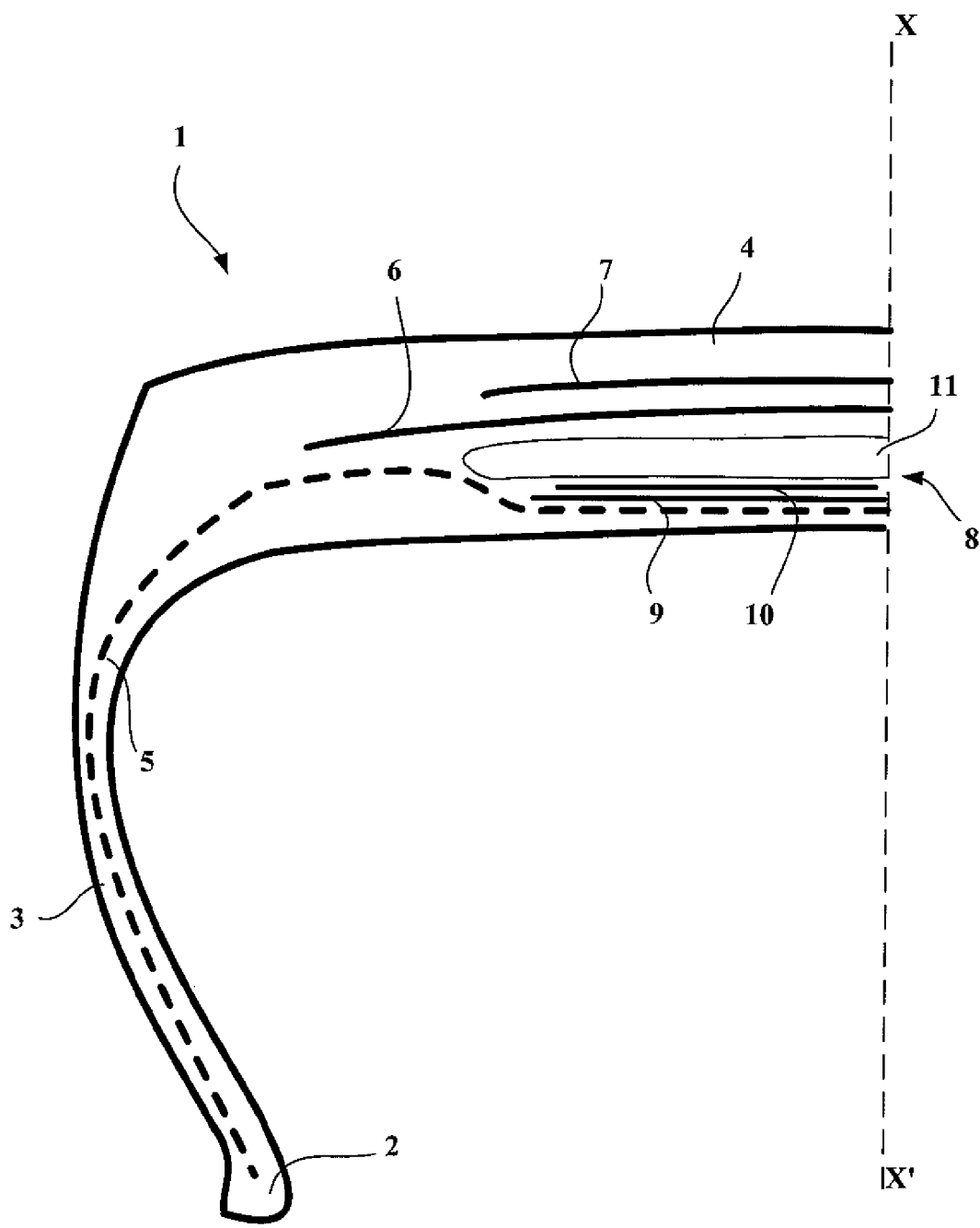
FIG. 1, a schematic view of a tire in a first embodiment of the invention.

FIG. 1 is a schematic diagram viewed on a radial cross section of a tire 1 built in accordance with the invention. The tire 1 of size 45/65R45 comprises two beads 2 designed to be fitted to the wheel rim seats. Each bead 2 is extended radially outwardly by a sidewall 3, said sidewall 3 leading in the radially outward direction to the tread 4 of said tire 1. The tire 1 comprises a carcass reinforcement 5 consisting of a layer of metal reinforcing elements.

The crown reinforcement comprised radially between the carcass reinforcement 5 and the tread 4 of the tire 1 also comprises two protective layers 6, 7 consisting of elastic reinforcing elements with widths of 245 and 288 mm, respectively.

Cables that exhibit a relative elongation of at least 4% under a tensile force equal to the breaking load are said to be "elastic".

Cables that exhibit a relative elongation of not more than 0.2% under a tensile force equal to 10% of the breaking force are said to be "inextensible".

The cables of said two protective crown layers 6 and 7 form an intersecting angle with each other and form, with the circumferential direction, angles of −45° and +45°, respectively, with the longitudinal direction of the tire.

In a position radially in between the carcass reinforcement 5 and the protective crown reinforcement is a complex 8 consisting on the one hand of two layers 9, 10 of inextensible reinforcing elements oriented at 8° relative to the longitudinal direction of the tire, parallel with each other and those of one layer forming an intersecting angle with those of the next, and of a layer of polymer mix 11.

The layers 9, 10 of inextensible reinforcing elements oriented at 8° have widths of 214 and 195 mm, respectively.

The layer of polymer mix 11 has a width of 260 mm and a maximum thickness of 34 mm, that is, 0.025 times the outside radius R of the tire.

A tire constructed in this way in accordance with the invention has been tested on a CAT 992 loader type vehicle moving about under normal conditions. These normal conditions of use are cycles of forward then reverse travel, bucket full or bucket empty, the latter being in the raised position or during lifting or lowering.

The results obtained are subjective assessments by the driver whose job is to analyze the behavior in terms of effectiveness and comfort. Effectiveness is assessed in terms of pauses which may be necessary for any oscillations to die away. Comfort is an analysis of the jolting or oscillation of the vehicle in terms of amplitude and frequency.

The results obtained are compared with results obtained with ordinary tires having the same features except for the presence of the complex 8. The results are obtained in both cases from the same driver, the tires being used on the same vehicle and the test cycle being identical.

This comparison leads to a classification in favor of the tire according to the invention in terms of both comfort and effectiveness regardless of the conditions of use, forward travel, reverse travel, bucket full or empty, bucket raised or moving. These tests reveal a substantial damping of the oscillations with the tire according to the invention as depicted in FIG. 1.

Figure 2:
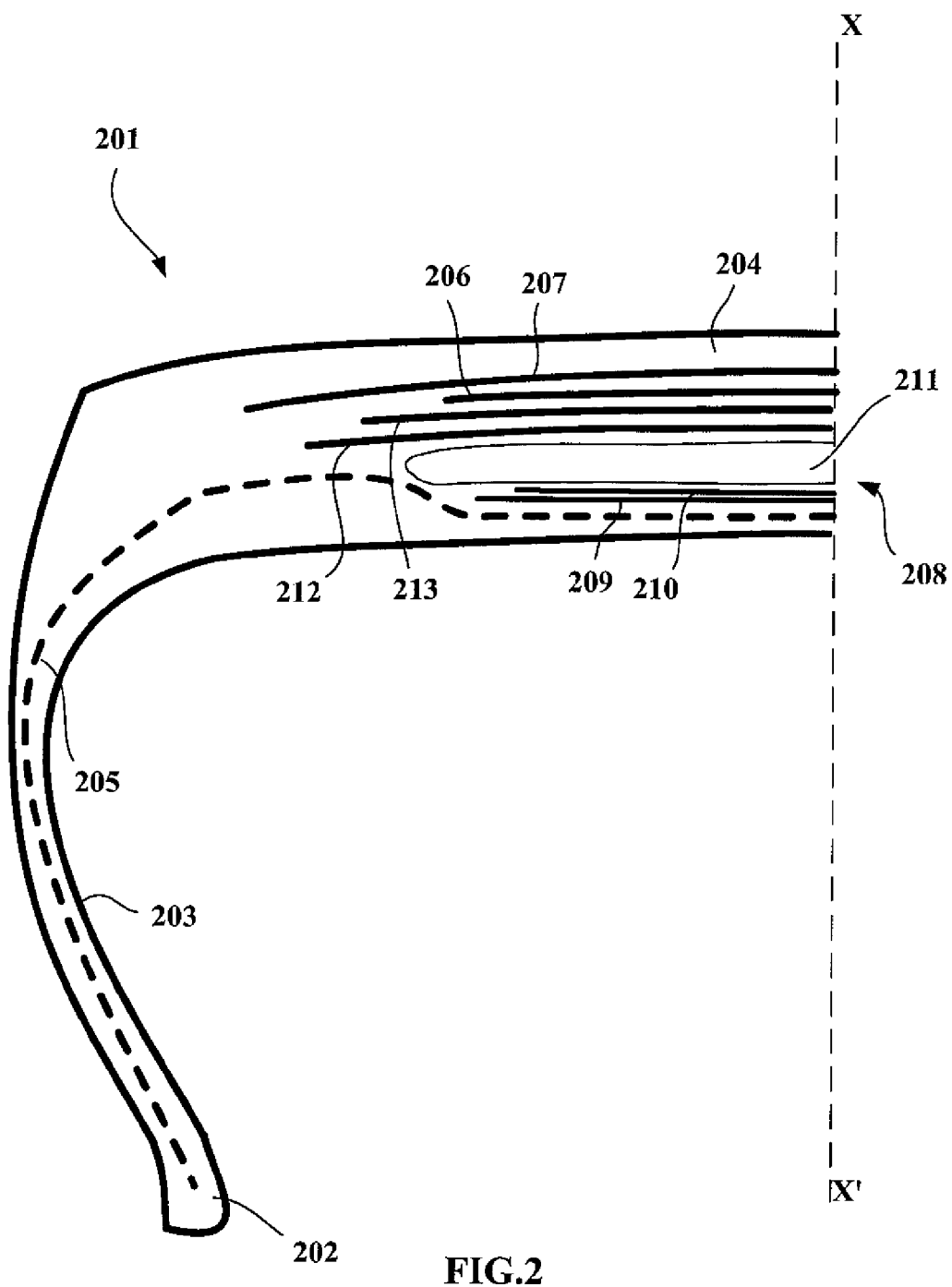
FIG. 2, a schematic view of a tire in a second embodiment of the invention.

FIG. 2 is a diagram taken on a radial cross section of a tire 201, built in accordance with the invention. The tire 201 differs from the tire 1 of FIG. 1 in also having two working crown layers 212, 213 interposed radially between the polymer mix layer 211 and the protective crown reinforcement.

These working crown layers 212, 213 are layers of metal reinforcing elements oriented at 45° relative to the longitudinal direction of the tire and those of one layer forming an intersecting angle with those of the next.

Moreover, the cables of the protective layer 206 that is radially nearest the working reinforcement form an intersecting angle with the cables of the working layer 213 that is radially furthest from the carcass reinforcement.

Tests identical to those described above were performed. The results obtained reveal that oscillations are damped even better with the tire depicted in FIG. 2 than with that of FIG. 1.

The invention claimed is:

1. A tire for a heavy vehicle, with radial carcass reinforcement, having an outside radius R greater than 1000 mm, comprising a crown reinforcement radially interposed between the carcass reinforcement and the tread, said crown reinforcement having at least one protective crown reinforcement radially adjacent to the tread, wherein said crown reinforcement comprises a complex including at least one layer of polymer mix with an axial width that is less than the width of the working crown reinforcement and with a thickness that is greater than 16 mm, and wherein the elastic modulus of said complex has a radial gradient, the lowest elastic modulus being greater than 15 MPa.

2. The tire according to claim 1, wherein the layer of polymer mix has isotropic elasticity properties.

3. The tire according to claim 1, wherein the thickness of at least one layer of polymer mix of the complex is greater than 0.01 times the outside radius R of the tire.

4. The tire according to claim 1, wherein the complex is radially surmounted by at least four layers of reinforcing elements.

5. The tire according to claim 1, wherein the tire has a deflection of greater than or equal to 40%.

6. The tire according to claim 1, wherein the complex is radially interposed between the carcass reinforcement and the protective crown reinforcement.

7. The tire according to claim 1, wherein the complex includes a layer of polymer mix with a thickness greater than 0.01 times the outside radius R of the tire and at least one layer of reinforcing elements with a modulus greater than 10,000 MPa, said elements being oriented at an angle of less than 12°.

8. The tire according to claim 7, wherein the tire comprises at least two radially adjacent layers of reinforcing elements of modulus greater than 10,000 MPa, the reinforcing elements being oriented at an angle of less than 12° and those of one layer forming an intersecting angle with those of the next.

9. The tire according to claim 7, wherein the radially adjacent layers of reinforcing elements of modulus greater than 10,000 MPa and oriented at an angle of less than 12° are radially adjacent to the carcass reinforcement.

10. The tire according to claim 1, wherein the crown reinforcement comprises a working crown reinforcement having at least two working crown layers and wherein the working crown reinforcement is radially adjacent to the complex.

11. The tire according to claim 10, wherein the working crown reinforcement is radially adjacent to that part of the complex which has the lowest modulus.

12. The tire according to claim 10, wherein the working crown reinforcement is radially adjacent to the protective crown reinforcement.

13. The tire according to claim 10, wherein the working crown layers are composed of metal reinforcing elements forming an angle with the circumferential direction of between 18° and 60°.

14. The tire according to claim 10, wherein the reinforcing elements of one working crown layer form an intersecting angle with those of the next.

15. The tire according to claim 1, wherein the protective crown reinforcement is made up of at least two layers of elastic metal reinforcing elements forming an angle with the circumferential direction of between 18° and 60°.

16. The tire according to claim 10, wherein at least one protective crown layer has an axial width greater than the width of the axially widest working crown layer.

* * * * *